(12) United States Patent
Kiselik

(10) Patent No.: US 7,066,896 B1
(45) Date of Patent: Jun. 27, 2006

(54) INTERACTIVE APPARATUS AND METHOD FOR DEVELOPING ABILITY IN THE NEUROMUSCULAR SYSTEM

(76) Inventor: Daniel R. Kiselik, P.O. Box 266, Leonia, NJ (US) 07605-0266

(*) Notice: Subject to any disclaimer, the term of this patent is extended or adjusted under 35 U.S.C. 154(b) by 29 days.

(21) Appl. No.: 10/292,120

(22) Filed: Nov. 12, 2002

(51) Int. Cl.
*A61H 3/00* (2006.01)
*A61H 1/02* (2006.01)
*A61F 5/01* (2006.01)

(52) U.S. Cl. .............. 601/5; 601/33; 601/35
(58) Field of Classification Search ........... 601/5, 601/23, 33, 34, 35; 623/24, 26; 414/2, 5
See application file for complete search history.

(56) References Cited

U.S. PATENT DOCUMENTS

| | | | |
|---|---|---|---|
| 2,832,334 A | 4/1958 | Whitelaw | |
| 4,716,889 A | 1/1988 | Saringer | |
| 5,117,814 A | 6/1992 | Luttrell et al. | |
| 5,282,460 A * | 2/1994 | Boldt | 601/13 |
| 5,417,643 A | 5/1995 | Taylor | |
| 5,466,213 A | 11/1995 | Hogan et al. | |
| 5,650,704 A | 7/1997 | Pratt et al. | |
| 5,738,636 A | 4/1998 | Saringer et al. | |
| 5,848,979 A | 12/1998 | Bonutti et al. | |
| 5,879,269 A | 3/1999 | Reck | |
| 5,891,061 A | 4/1999 | Kaiser | |
| 5,951,499 A | 9/1999 | Saringer et al. | |
| 5,961,541 A | 10/1999 | Ferrati | |
| 5,980,435 A | 11/1999 | Joutras et al. | |
| 2001/0029343 A1 * | 10/2001 | Seto et al. | 600/587 |
| 2002/0026130 A1 * | 2/2002 | West | 601/23 |
| 2004/0158175 A1 * | 8/2004 | Ikeuchi et al. | 601/5 |

FOREIGN PATENT DOCUMENTS

| | | | |
|---|---|---|---|
| GB | 2201260 | * | 8/1988 |
| WO | WO 94/09727 | * | 5/1994 |

* cited by examiner

*Primary Examiner*—Danton DeMille
(74) *Attorney, Agent, or Firm*—Arthur Jacob

(57) ABSTRACT

Apparatus and method for developing ability in the neuromuscular system of a user coupled, at coupling sites adjacent selected musculature, to anthropomorphic members of the apparatus by moving the anthropomorphic members through repetitive cycles such that during each cycle a force exerted by the user on the anthropomorphic members, along predetermined prescribed paths of movement through a prescribed range of motion at a predetermined speed of motion, with the paths of movement, the range of motion and the speed of motion unaltered by the user, and with an applied force transmitted by the anthropomorphic members to the selected musculature at the coupling sites, while varying the applied force in response to variations in the further force so as to develop an ability in the neuromuscular system associated with the selected musculature.

28 Claims, 6 Drawing Sheets

INTERACTIVE APPARATUS AND METHOD FOR DEVELOPING ABILITY IN THE NEUROMUSCULAR SYSTEM

The present invention relates generally to the improvement or enhancement of human physical performance and pertains, more specifically, to interactive apparatus and method for developing ability in the neuromuscular system.

A wide variety of apparatus and protocols have been made available to users who wish to enhance their physical performance, as well as to users requiring rehabilitation of various physical functions or who seek to slow or stem deterioration of physical functions resulting from injury, disease or from age. Training and exercise devices and routines find use in various forms of athletic pursuits as well as in therapeutic regimens.

The present invention provides interactive apparatus and method for improving and enhancing human physical performance through developing ability in the neuromuscular system. Improved ability is manifested in the form of higher levels of strength and endurance, the rehabilitation of impaired, injured or otherwise damaged neuromuscular systems, the slowing or stemming of deteriorating in the neuromuscular system, or the building of athletic skills. It has been recognized that the human brain has the capacity to adapt and reorganize around an existing impediment to re-establish lost functions. The mechanism is known as neuroplasticity. The apparatus and method of the present invention rely largely upon neuroplasticity to develop ability, including increased capabilities, in the neuromuscular system. Repetitive cycles of movement along specific paths of movement, through prescribed ranges of motion, at predetermined speeds of motion, along with the application of specified individual or combinations of resistive or assistive forces are utilized by the present invention to attain abilities, including increased capabilities, in the neuromuscular system. In addition, the apparatus and method of the present invention provide physical therapy regimens which constitute an improvement over conventional physical therapy routines. Examples of those areas in which the present invention attains abilities, including increased capabilities, are as follows: Maintaining suppleness and building strength, endurance and capability in selected muscle groups through the use of a dynamic combination of cycles of continuous passive motion and progressive resistance; providing post-surgical and orthopedic rehabilitation through the use of dynamic combinations of cyclical assistance and resistance forces; normalization of spasticity by managing muscle tone through the use of cycles of assistance and resistance forces over prescribed ranges of motion at predetermined speeds of motion; development of gross motor control through cyclical assistance and resistance applied dynamically; development of fine motor control through cycles of complex assistance and resistance in conjunction with prescribed movements over ranges of motion and speeds of motion; and development of elite movements and capability in athletic endeavors using cycles of complex assistance and resistance in conjunction with prescribed movements over ranges of motion and speeds of motion.

Thus, the present invention attains several objects and advantages, some of which are summarized as follows: Enables a user to establish and pursue a safe, reliable and effective training regimen tailored specifically to the user in building strength and endurance; provides for the safe, reliable and effective rehabilitation of an impaired, injured or otherwise damaged neuromuscular system, and does so with an individual, personalized regiment; slows or stems deterioration of the neuromuscular system; allows for the safe, reliable and effective development of athletic skills and performance; provides interactive apparatus and method for accomplishing the development of improved abilities or increased capabilities in the neuromuscular system for better strength and endurance, for therapeutic rehabilitation, for combating deterioration, or for enhanced athletic skill and performance; accommodates the needs of a wide variety of users with reliable and accurate regimens tailored specifically to those needs; accomplishes enhanced performance, training, rehabilitation and reduced deterioration with relative economy and a high degree of reliability over an extended service life.

The above objects and advantages, as well as further objects and advantages, are attained by the present invention which may be described briefly as interactive apparatus for developing ability in the neuromuscular system of a user of the apparatus, the apparatus comprising: anthropomorphic members movable through given movements relative to one another; actuators for moving the anthropomorphic members through the given movements relative to one another in response to actuation of corresponding actuators; a coupling arrangement for coupling a user with the anthropomorphic members at coupling sites located adjacent selected musculature, and for providing body information pertaining to a unique body habitus of the user at the coupling sites; a processor for deriving paths of movement through a prescribed range of motion of the anthropomorphic members based upon the body information; and a controller for operating in response to the processor in at least one of a diagnostic mode and a cyclical mode, such that in the diagnostic mode of operation the actuators are controlled by the controller to move the anthropomorphic members relative to one another along the paths of movement derived from the body information to provide to the processor condition information pertaining to a relative ability of the neuromuscular system associated with the selected musculature to perform within the prescribed range of motion, in response to a resistance force applied by the user to the anthropomorphic members throughout the prescribed range of motion, and in the cyclical mode of operation the actuators are controlled by the controller to move the anthropomorphic members relative to one another through repetitive cycles along the paths of movement through the range of motion at a predetermined speed of motion such that during each cycle exertion of a further force by the user on the anthropomorphic members, with the paths of movement, the range of motion and the speed of motion unalterable by the user, an applied force derived by the processor from the condition information is transmitted by the anthropomorphic members to the selected musculature at the coupling sites, with the applied force being varied in response to variations in the further force so as to develop ability in the neuromuscular system associated with the selected musculature.

Further, the invention includes a method for developing ability in the neuromuscular system of a user of the method, the method comprising: providing anthropomorphic members movable through given movements relative to one another; coupling a user with the anthropomorphic members at coupling sites located adjacent selected musculature, and obtaining body information pertaining to a unique body habitus of the user at the coupling sites; and operating the anthropomorphic members in at least one of a diagnostic mode wherein the anthropomorphic members are moved relative to one another along paths of movement through a prescribed range of motion derived from the body information to obtain condition information pertaining to a relative ability of the neuromuscular system associated with the selected musculature to perform within the prescribed range of motion, in response to a resistance force applied by the user to the anthropomorphic members throughout the range of motion, and a cyclical mode wherein the anthropomorphic members are moved relative to one another through repetitive cycles along the paths of movement through the range of motion at a predetermined speed of motion such that during each cycle exertion of a further force by the user on the anthropomorphic members, with the paths of movement, the range of motion and the speed of motion unalterable by the user, an applied force derived from the condition information is transmitted by the anthropomorphic members to the selected musculature at the coupling sites, while the applied force is varied in response to variations in the further force so as to develop an ability in the neuromuscular system associated with the selected musculature.

The invention will be understood more fully, while still further objects and advantages will become apparent, in the following detailed description of preferred embodiments of the invention illustrated in the accompanying drawing, in which.

Figure 1:
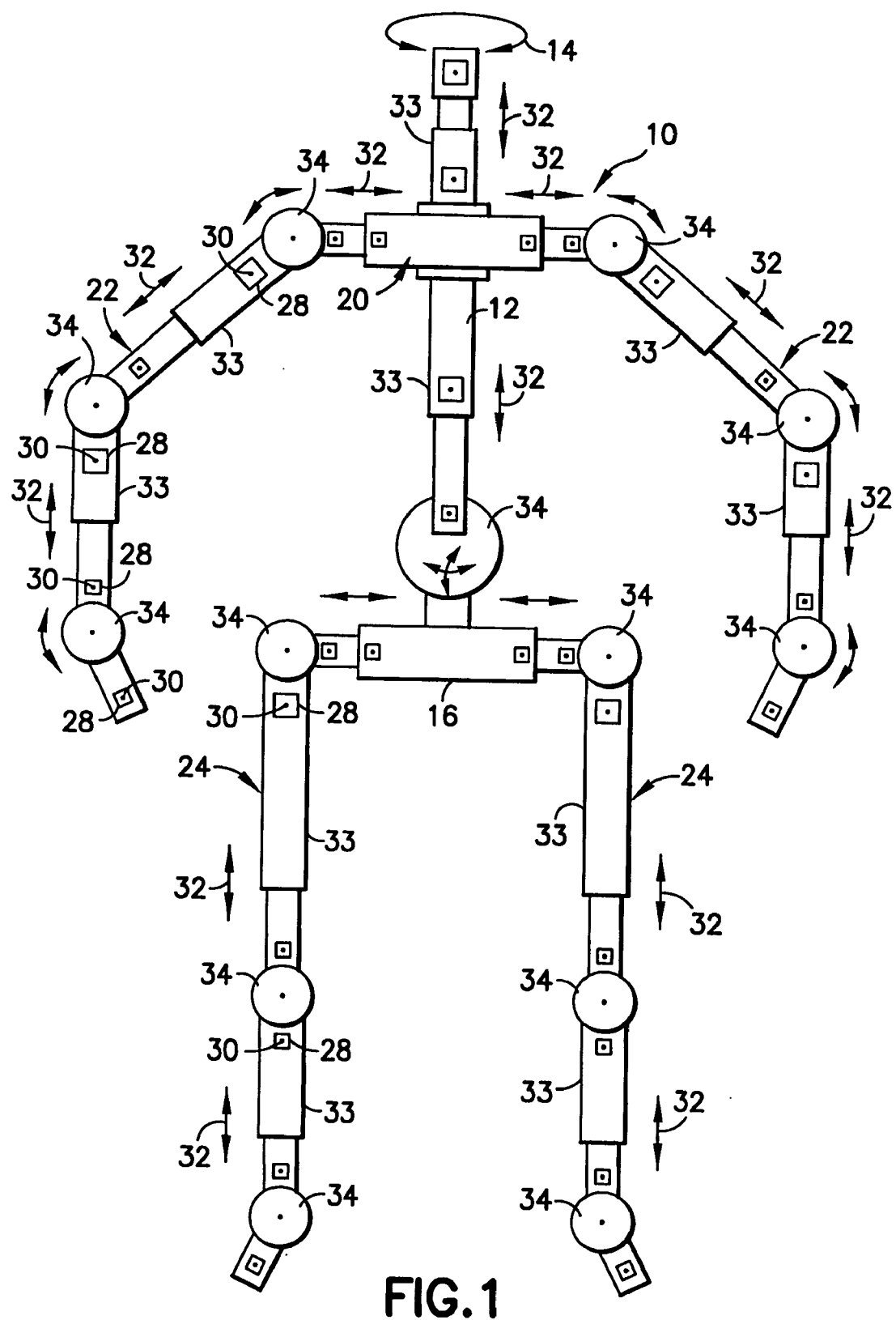
FIG. 1 is a largely diagrammatic pictorial view of an apparatus constructed in accordance with the present invention.

Referring now to the drawing, and especially to FIG. 1 thereof, apparatus constructed in accordance with the present invention is shown to include an exo-skeleton device in the form of a frame 10 having anthropomorphic members including a central spine member 12, extending from a head end 14 to a hip end 16, a shoulder member 20 located longitudinally intermediate the head end 14 and the hip end 16 of the spine member 12, and arm members 22 extending laterally from the shoulder member 20. Leg members 24 extend from the hip end 16 of the spine member 12 to provide the frame 10 with a configuration which essentially follows the human form.

A coupling arrangement includes a plurality of couplers 28 placed at coupling sites 30, and the spine member 12, the shoulder member 20, the arm members 22 and the leg members 24 each are selectively adjustable in length, as indicated by arrows 32, the anthropomorphic members each being shown in the form of extensible/retractable anthropomorphic members 33, so as to enable the frame 10 to be adjusted to accommodate the physical configuration, or unique body habitus, of a user to be coupled to the apparatus. Further, a plurality of actuators 34, such as those described in U.S. Pat. No. 5,650,704, are placed at locations corresponding to natural joints of the human body for moving corresponding anthropomorphic members of the frame 10 through given movements relative to one another, all as will be described in greater detail below.

Figure 2:
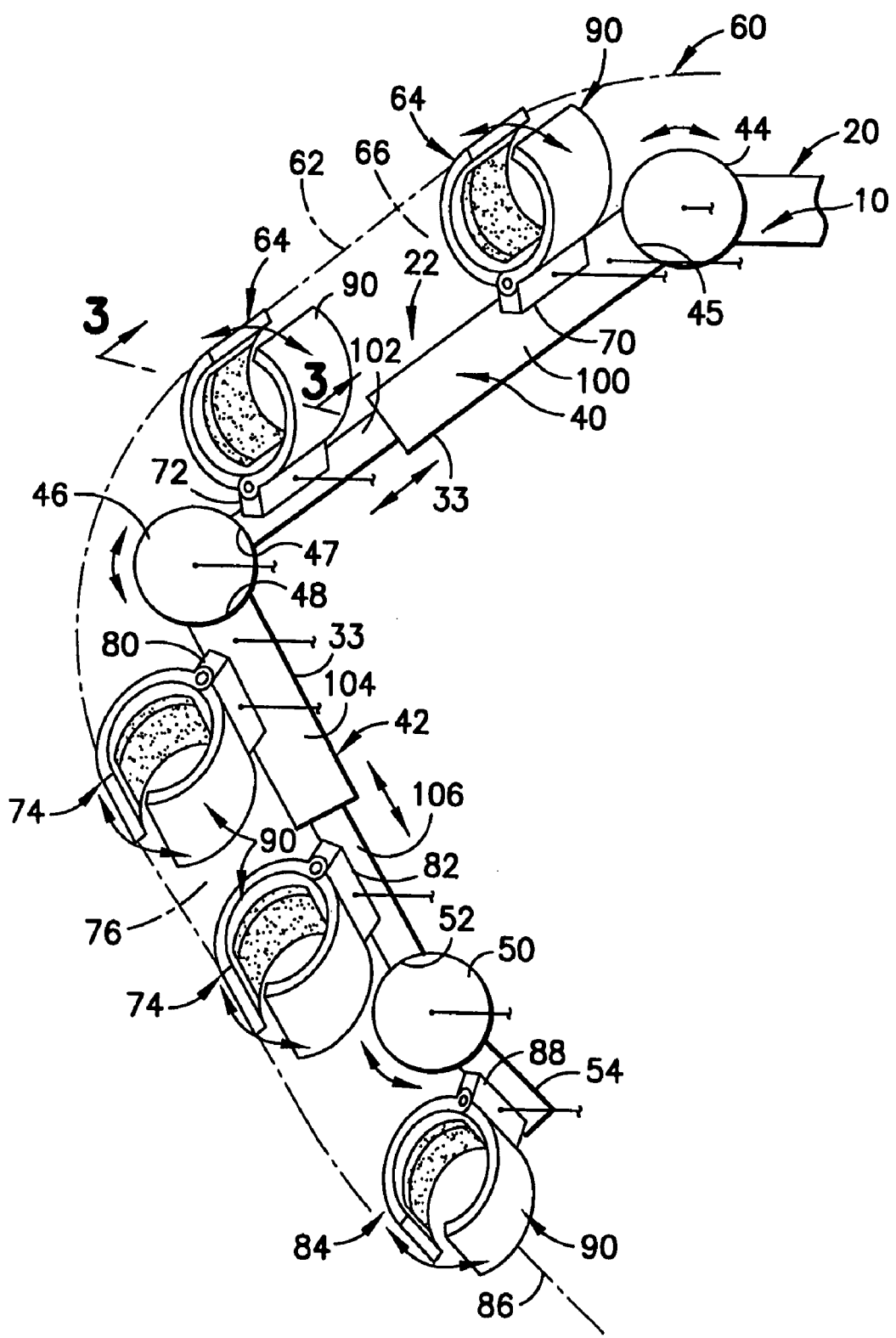
FIG. 2 is a largely diagrammatic pictorial view of a portion of the apparatus.

Turning now to FIG. 2, a portion of frame 10 is shown as an illustrated example of an apparatus and method of the present invention. Thus, as an example of an anthropomorphic robotic appendage, arm member 22 is seen to include an upper arm member 40 and a lower arm member 42. A shoulder actuator 44 connects end 45 of the upper arm member 40 with shoulder member 20, an elbow actuator 46 connects end 47 of the upper arm member 40 with end 48 of the lower arm member 42, and a wrist actuator 50 is connected between end 52 of the lower arm member 42 and a wrist member 54. Arm member 22 is to be used to apply physical, or neuromuscular therapy to an injured or otherwise impaired neuromuscular system of user 60, with arm activity being cited as an example of that which is to be rehabilitated. Couplings are located at coupling sites along the arm member 22 for coupling arm 62 of the user 60, to the arm member 22, as follows: Upper couplings 64 will couple upper arm 66 of the user 60 to upper arm member 40, at coupling sites 70 and 72. Lower couplings 74 will couple lower arm 76 to lower arm member 42 at coupling sites 80 and 82. A further coupling 84 will couple wrist 86 to wrist member 54 at coupling site 88. The couplings are each in the form of a cuff 90 having clamping jaws 92 hinged at 94, the jaws 92 normally being open to receive a corresponding portion of the user's arm 62. The arm 62 is located upon the arm member 22, placed loosely within the several couplings along the arm member 22, for subsequent appropriate alignment and affixation within the couplings 64, 74 and 84.

The arm member 22 then is adjusted in length, either manually or automatically, to place each coupling site at a prescribed location adjacent the musculature selected for rehabilitation. To this end, upper arm member 40 includes telescoping elements 100 and 102 which are movable relative to one another, either manually or automatically, to vary the length of the upper arm member 40 between ends 45 and 47 so as to correspond to the length of the upper arm 66 of the user 60. In a like manner, lower arm member 42 includes telescoping elements 104 and 106 which are movable relative to one another to vary the length of the lower arm member 42 between ends 48 and 52 so as to correspond to the length of the lower arm 76 of user 60.

Figure 3:
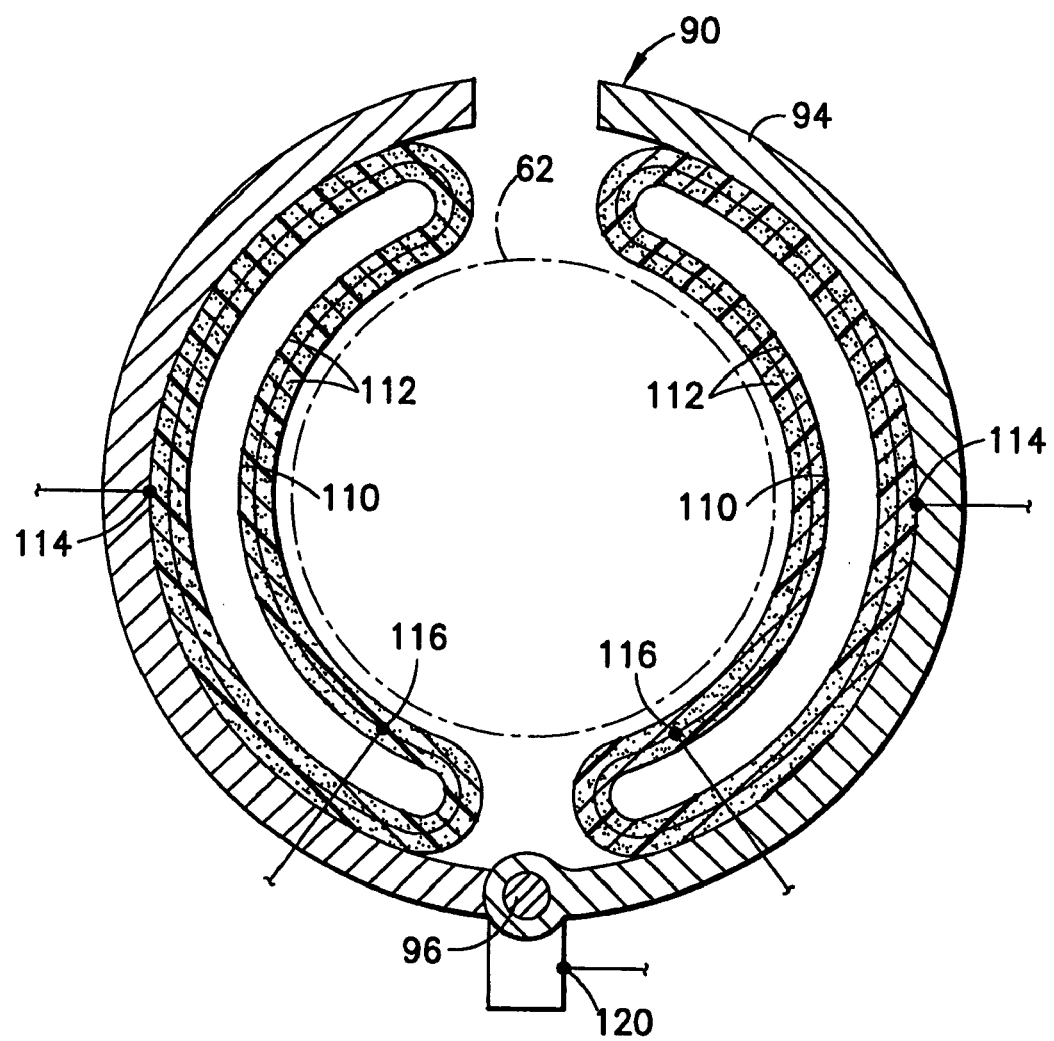
FIG. 3 is an enlarged, partially diagrammatic cross-sectional view taken along line 3—3 of FIG. 2.

Once the arm member 22 has been adjusted to correspond with the specific body habitus of user 60, the cuffs 90 are closed, securing the arm 62 of user 60 in place on the arm member 22. As seen in FIG. 3, cuffs 90 each include an air bladder 110 surrounded by layers 112 of resiliently expansible material, preferably in the form of foamed synthetic polymeric material, such as a foamed urethane, affixed to a respective hinged jaw 92. Upon closing cuffs 90, air bladders 110 are inflated to secure the arm 62 of user 60 in place on the arm member 22. Sensors 114 embedded within the cuffs 90 assure an appropriate snug fit between the cuffs 90 and the arm 62, as well as effective securement of the arm 62 within cuffs 90. Additional sensors 116 may be provided in order to furnish information pertaining to the user's pulse, blood pressure, temperature or other physical indicators so as to enable the condition of the user 60 to be monitored during subsequent operations.

Figure 4:
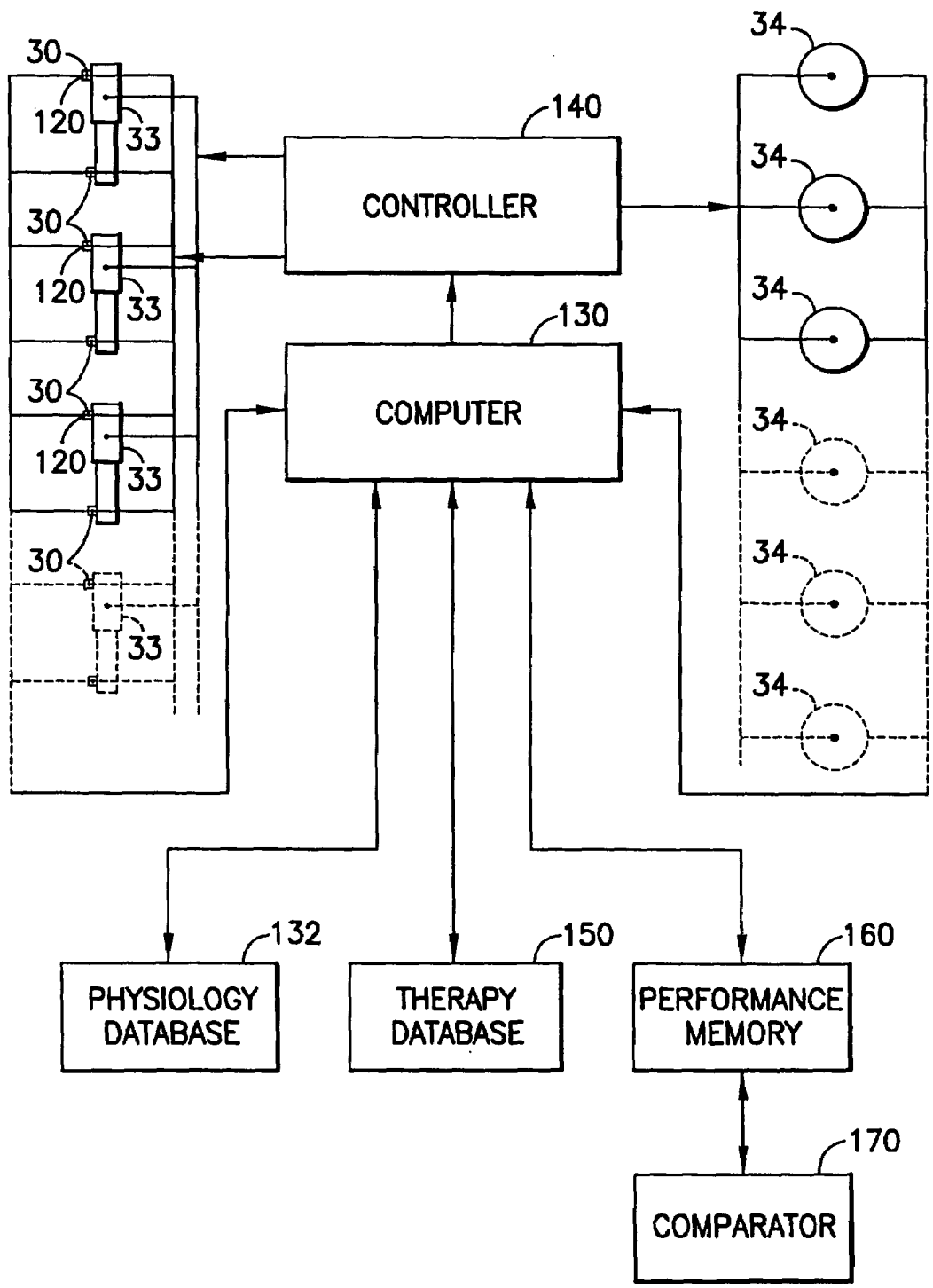
FIG. 4 is a block diagram showing one apparatus and method of the present invention.

Referring now to FIG. 4, as well as to FIG. 2, in an initial sequence of operation, the unique body habitus of the user 60 is determined by the location of the coupling sites 30 when the length of the arm member 22 is fully adjusted to the arm 62 of the user 60 and the cuffs 90 are closed to secure the arm 62 in place in proper alignment with the arm member 22. Sensors 120 carried by the cuffs 90 provide information to a processor in the form of computer 130 which then places the information in a physiology database 132 as a record of the unique body habitus of the user 60. The information may include such attributes as the length and girth of the upper arm 66 and the lower arm 76. Where the arm member 22 is adjusted automatically, a controller 140 is operated by the computer 130 to actuate the telescoping elements 100, 102, 104 and 106, the sensors 120 providing location information for determining the unique body habitus of user 60.

In a diagnostic mode of operation, the computer 130 utilizes the information pertaining to the unique body habitus of the user 60 to prescribe specific paths of movement through a range of motion through which the arm 62 is to be moved to assess the ability of the neuromuscular system of the user 60 to move the arm 62 through a range of motion with a certain degree of strength. The controller 140 operates in response to the computer 130 to actuate the actuators 44, 46 and 50 to move the upper arm member 40, the lower arm member 42 and the wrist member 54 along the prescribed paths of movement, through the prescribed range of motion, as determined by the unique body habitus of the user 60. A resistance force is applied by the user 60 to the members 40, 42 and 54 throughout the range of motion to derive a relative ability of the neuromuscular system pertaining to the selected musculature, that is, the relative strength of the musculature associated with the arm 62 of the user 60, throughout the range of motion. Information pertaining to the precise movement required to attain a desired outcome, such as stimulating alternative neural pathways, encouraging neuroplasticity, building memory in the neuromuscular system, strengthening the associated musculature and maximizing the range of motion, is then determined and stored as a rehabilitation regimen in a therapy database 140.

The computer 130 operates the controller 140 in a cyclical mode of operation wherein the actuators 44, 46 and 50 are controlled by the controller 140 to move the members 40, 42 and 54 relative to one another through repetitive cycles. During each cycle a further force is exerted by the user 60 on the members 40, 42 and 54, along the paths of movement through the range of motion at a predetermined speed of motion determined by the rehabilitation regimen. An applied force, originating at the actuators 44, 46 and 50, is transmitted by the members 40, 42 and 54 to the user's musculature, at the coupling sites 30, the applied force being varied in response to variations in the further force exerted by the user 60 so as to develop an ability in the neuromuscular system, in terms of increased strength in the selected musculature or reduced deterioration in the neuromuscular system. The apparatus is constructed so that the user 60 cannot, and does not, alter the paths of movement, and cannot, and does not, change the paths of movement, the range of motion, or the speed of movement prescribed by the rehabilitation regimen.

The force exerted by the user 60 and the assistance provided by the applied force are measured along the paths of movement for each repetition provided by each cycle. When the user 60 varies the exerted further force, the controller 140 varies the applied force such that the applied force is reduced in response to an increase in the further force exerted by the user 60, and the applied force is increased in response to a reduction in the further force exerted by the user 60. In this manner, an ability is developed in the neuromuscular system, in terms of increased strength in the selected musculature of the user 60 or reduced deterioration in the neuromuscular system.

The therapy routine is recorded and stored in a performance memory 160 in the form of performance information pertaining to the range of motion, the speed of motion, and the applied force transmitted during each of the repetitive cycles of operation connected with each session of therapy. A comparator 170 compares performance information derived from subsequent sessions with stored performance information derived from previous sessions so that in response to subsequent performance reaching a predetermined performance threshold, the controller 140 will repeat operation in the diagnostic mode so as to derive an updated relative ability for repetitive cycles of a subsequent cyclical mode of operation. In this manner, the rehabilitation regimen is continually evaluated and fine-tuned to the specific requirements of a particular individual user for maximum benefit to the user 60.

Figure 5:
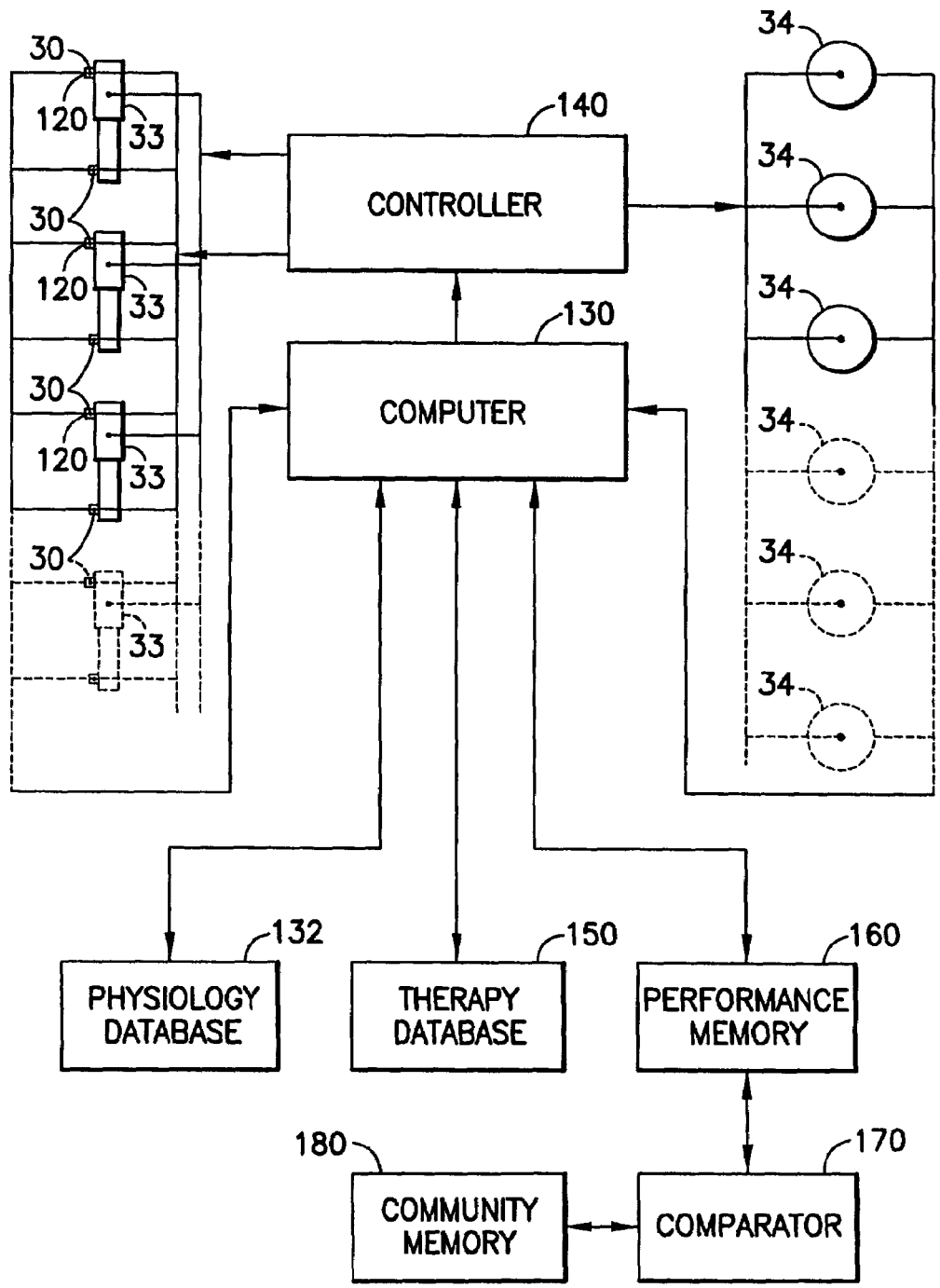
FIG. 5 is a block diagram showing another apparatus and method of the invention.

In the embodiment of FIG. 5, the performance memory 160 is supplemented with a community memory 180 for storing information pertaining to the abilities in the neuromuscular systems of a community of users with respect to musculature corresponding to the selected musculature of the user 60. Comparator 170 then compares the information indicative of the ability in the neuromuscular system pertaining to the selected musculature of the user 60 with the stored performance information pertaining to corresponding abilities of the community of users so as to derive an updated ability relative to the stored performance information and enable a further refinement of the rehabilitation regimen, based upon the aggregated performance history and progress of the community of users, as well of the user 60. In this manner, refinements in the rehabilitation regimen will provide a maximum benefit not only to user 60, but to all users in the community of users by redistributing refined rehabilitation regimens to the entire community of users.

The apparatus of FIG. 4 and of FIG. 5 each find use in enhancing human performance by conducting functions akin to a personal trainer. While the initial sequence of operation and the diagnostic mode of operation remain essentially the same as described above in connection with FIGS. 2 through 5, operation in the cyclical mode is modified. In order to build strength in the selected musculature of the user 60 across the range of motion, the force exerted by the user 60 is measured across the movement for each repetition. When the user 60 exerts less force on the arm member 22, the force applied to the arm 62 of the user 60 by the arm member 22 is reduced in response to such exertion of less force by the user 60. Conversely, when the user 60 exerts more force on the arm member 22, the force applied by the arm member 22 to the arm 62 of the user 60 is increased in response to such exertion of more force by the user 60. In this manner, the repetitive cycles of operation will build strength in the selected musculature of the user 60.

Figure 6:
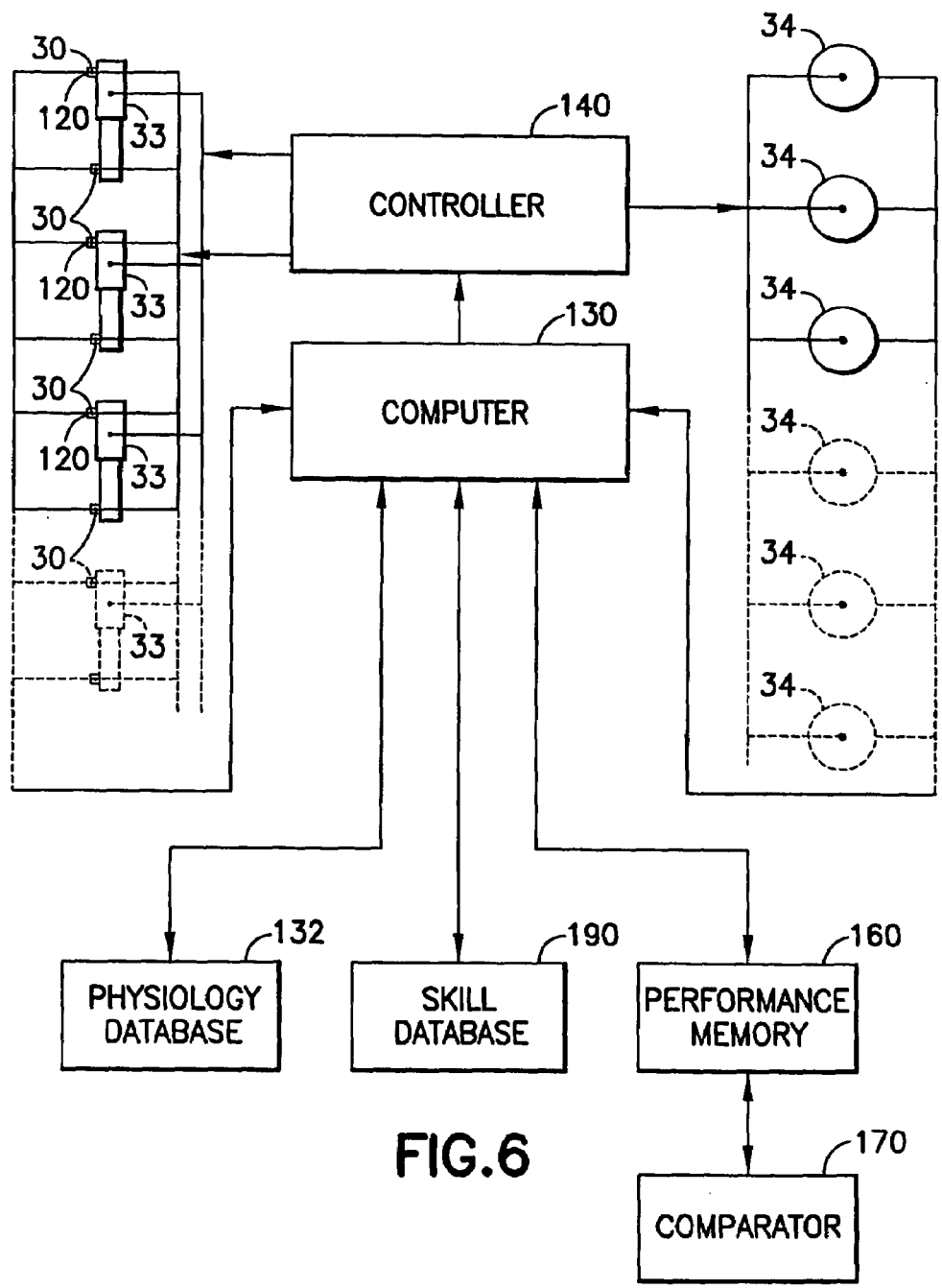
FIG. 6 is a block diagram showing still another apparatus and method of the invention.

In the embodiment shown in FIG. 6, the therapy database 150 is replaced by a skill database 180 in an apparatus for imparting to the neuromuscular system of user 60 abilities required for performing a particular skill and, more specifically, a particular athletic skill. Depending upon the nature of the particular athletic skill, the entire exo-skeleton device of frame 10 may be placed into use, or selected portions may be used in order to treat the appropriate selected musculature. Athletic performance is improved by simultaneously reinforcing abilities of the neuromuscular system in terms of memory, timing and strength.

Using, as an example, the development in the user 60 of a tennis forehand skill, the user 60 is coupled to the anthropomorphic exo-skeleton device provided by frame 10, and the frame 10 is adjusted to the user's specific body habitus; that is, the several anthropomorphic members 33 of the frame 10 are adjusted in length to place the various coupling sites 30 at appropriate locations relative to the musculature to be treated. Thus, the ankles, knees, hips, shoulders, wrists and elbows of the user 60 are all secured by means of corresponding cuffs 90 to frame 10. Information pertaining to the adjusted configuration is placed in the physiology database 132 as a record of the unique body habitus of the user 60. The information may include such attributes as the length and girth of the torso and the various limbs of the user 60, as well as the relative locations of the limbs and torso, and the location of corresponding joints. The record of the unique body habitus is retained for use at each subsequent skill development session attended by the user 60.

Based upon the specific body habitus of the user 60, the precise movement of the user's body necessary to execute an ideal forehand stroke is prescribed and is programmed into the skill database 190. The controller 140 then is operated in the diagnostic mode to assess the user's strength over the entire movement of the user's body through the prescribed movement. To that end, the actuators 34 are controlled by the controller 140 to move the anthropomorphic members 33 relative to one another along paths of movement determined by the unique body habitus of the user 60 to derive a relative ability of the neuromuscular system pertaining to the musculature to be treated through a range of motion prescribed by the precise movement necessary to execute the forehand stroke, in response to a resistance force applied by the user 60 to the anthropomorphic members 33. The controller 140 then is operated in the cyclical mode wherein the actuators 34 are controlled by the controller 140 to move the anthropomorphic members 33 relative to one another through repetitive cycles such that during each cycle a further force is exerted by the user 60 on the anthropomorphic members 33, along the paths of movement through the range of motion at a predetermined speed of motion, all determined by the prescribed movement necessary for the ideal forehand stroke. The prescribed movement coordinates the positioning of feet and shifting of weight, as well as back-shoulder-elbow-wrist movement needed to execute the forehand stroke. Throughout each cycle, an applied force is transmitted by the anthropomorphic members 33 to the selected musculature of the user 60, at the coupling sites 30, while the applied force is varied in response to variations in the further force exerted by the user 60 so as to impress upon the neuromuscular system of the user 60 an increased ability in terms of memory, timing and strength required to execute the ideal forehand stroke.

The user's progress is measured and information pertaining to the progress achieved in each skill development session, in terms of an increased capability in the neuromuscular system, is placed in the performance memory 160. At each subsequent session, the comparator 60 compares the information pertaining to the ability attained at a previous session with the abilities required in the neuromuscular system for accomplishing execution of the ideal forehand stroke to derive an updated relative ability and determine paths of movement through a range of motion at a speed of motion and an applied force during repetitive cycles of the cyclical mode of operation during the subsequent session. In this manner, the desired skill is acquired over a series of skill development sessions.

It will be seen that the present invention attains all of the objects and advantages summarized above, namely: Enables a user to establish and pursue a safe, reliable and effective training regimen tailored specifically to the user in building strength and endurance; provides for the safe, reliable and effective rehabilitation of an impaired, injured or otherwise damaged neuromuscular system, and does so with an individual, personalized regiment; slows or stems deterioration of the neuromuscular system; allows for the safe, reliable and effective development of athletic skills and performance; provides interactive apparatus and method for accomplishing the development of improved abilities or increased capabilities in the neuromuscular system for better strength and endurance, for therapeutic rehabilitation, for combating deterioration, or for enhanced athletic skill and performance; accommodates the needs of a wide variety of users with reliable and accurate regimens tailored specifically to those needs; accomplishes enhanced performance, training, rehabilitation and reduced deterioration with relative economy and a high degree of reliability over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. Interactive apparatus for developing ability in the neuromuscular system of a user of the apparatus, the apparatus comprising:
   anthropomorphic members movable through given movements relative to one another;
   actuators for moving the anthropomorphic members through the given movements relative to one another in response to actuation of corresponding actuators;
   a coupling arrangement for coupling a user with the anthropomorphic members at coupling sites located adjacent selected musculature, and for providing body information pertaining to a unique body habitus of the user at the coupling sites;
   a processor for deriving paths of movement through a prescribed range of motion of the anthropomorphic members based upon the body information; and
   a controller for operating in response to the processor in at least one of a diagnostic mode and a cyclical mode, such that in the diagnostic mode of operation the actuators are controlled by the controller to move the anthropomorphic members relative to one another along the paths of movement derived from the body information to provide to the processor condition information pertaining to a relative ability of the neuromuscular system associated with the selected musculature to perform within the prescribed range of motion, in response to a resistance force applied by the user to the anthropomorphic members throughout the prescribed range of motion, and in the cyclical mode of operation the actuators are controlled by the controller to move the anthropomorphic members relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived by the processor from the condition information and applied by the actuators to the anthropomorphic members is transmitted by the anthropomorphic members to the selected musculature at the coupling sites, with the applied force being varied in response to variations in the further force exerted by the user such that the applied force is reduced in response to an increase in the further force, and the applied force is increased in response to a reduction in the further force so as to develop ability in the neuromuscular system associated with the selected musculature.

2. Interactive apparatus for developing ability in the neuromuscular system of a user of the apparatus, the apparatus comprising:
   anthropomorphic members movable through given movements relative to one another;
   actuators for moving the anthropomorphic members through the given movements relative to one another in response to actuation of corresponding actuators;
   a coupling arrangement for coupling a user with the anthropomorphic members at coupling sites located adjacent selected musculature, and for providing body information pertaining to a unique body habitus of the user at the coupling sites;
   a processor for deriving paths of movement through a prescribed range of motion of the anthropomorphic members based upon the body information;
   a controller for operating in response to the processor in at least one of a diagnostic mode and a cyclical mode, such that in the diagnostic mode of operation the actuators are controlled by the controller to move the anthropomorphic members relative to one another along the paths of movement derived from the body information to provide to the processor condition information pertaining to a relative ability of the neuromuscular system associated with the selected musculature to perform within the prescribed range of motion, in response to a resistance force applied by the user to the anthropomorphic members throughout the prescribed range of motion, and in the cyclical mode of operation the actuators are controlled by the controller to move the anthropomorphic members relative to one another through repetitive cycles along the path of movement through the range of motion at a predetermined speed of motion such that upon exertion of a further force by the user on the anthropomorphic members during each cycle, with the paths of movement, the range of motion and the speed of motion unalterable by the user, an applied force derived by the processor from the condition information and applied by the actuators to the anthropomorphic members is transmitted by the anthropomorphic members to the selected musculature at the coupling sites, with the applied force being varied in response to variations in the further force exerted by the user so as to develop ability in the neuromuscular system associated with the selected musculature;
   a memory for storing performance information pertaining to the range of motion, the speed of motion, and the applied force transmitted during each of the repetitive cycles; and
   a comparator for comparing subsequent performance information with stored performance information such that the controller, in response to the processor, repeats operation in the diagnostic mode in response to subsequent performance reaching a predetermined performance threshold so as to derive an updated relative ability for repetitive cycles of a subsequent cyclical mode of operation.

3. The apparatus of claim 2 wherein during operation in the cyclical mode, the controller, in response to the processor, varies the applied force such that the applied force is reduced in response to a reduction in the further force, and the applied force is increased in response to an increase in the further force.

4. The apparatus of claim 2 wherein during operation in the cyclical mode, the controller, in response to the processor, varies the applied force such that the applied force is reduced in response to an increase in the further force, and the applied force is increased in response to a reduction in the further force.

5. Interactive apparatus for developing ability in the neuromuscular system of a user of the apparatus, the apparatus comprising:
   anthropomorphic members movable through given movements relative to one another;
   actuators for moving the anthropomorphic members through the given movements relative to one another in response to actuation of corresponding actuators;
   a coupling arrangement for coupling a user with the anthropomorphic members at coupling sites located adjacent selected musculature, and for providing body information pertaining to a unique body habitus of the user at the coupling sites;
   a processor for deriving paths of movement through a prescribed range of motion of the anthropomorphic members based upon the body information;
   a controller for operating in response to the processor in at least one of a diagnostic mode and a cyclical mode, such that in the diagnostic mode of operation the actuators are controlled by the controller to move the anthropomorphic members relative to one another along the paths of movement derived from the body information to provide to the processor condition information pertaining to a relative ability of the neuromuscular system associated with the selected musculature to perform within the prescribed range of motion, in response to a resistance force applied by the user to the anthropomorphic members throughout the prescribed range of motion, and in the cyclical mode of operation the actuators are controlled by the controller to move the anthropomorphic members relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived by the processor from the condition information and applied by the actuators to the anthropomorphic members is transmitted by the anthropomorphic members to the selected musculature at the coupling sites, with the applied force being varied in response to variations in the further force exerted by the user so as to develop ability in the neuromuscular system associated with the selected musculature;
   a memory for storing performance information pertaining to the abilities of neuromuscular systems of a community of users with respect to musculature corresponding to the selected musculature and
   a comparator for comparing the information pertaining to the ability in the neuromuscular system associated with the selected musculature with the stored performance information pertaining to the corresponding abilities of the community of users so as to derive an updated ability relative to the stored performance information for repetitive cycles of a subsequent cyclical mode of operation.

6. The apparatus of claim 5 wherein during operation in the cyclical mode, the controller, in response to the processor, varies the applied force such that the applied force is reduced in response to a reduction in the further force, and the applied force is increased in response to an increase in the further force.

7. The apparatus of claim 5 wherein during operation in the cyclical mode, the controller, in response to the processor, varies the applied force such that the applied force is reduced in response to an increase in the further force, and the applied force is increased in response to a reduction in the further force.

8. Interactive apparatus for developing ability in the neuromuscular system of a user of the apparatus, the apparatus comprising:

anthropomorphic members movable through given movements relative to one another;

actuators for moving the anthropomorphic members through the given movements relative to one another in response to actuation of corresponding actuators;

a coupling arrangement for coupling a user with the anthropomorphic members at coupling sites located adjacent selected musculature, and for providing body information pertaining to a unique body habitus of the user at the coupling sites;

a processor for deriving paths of movement through a prescribed range of motion of the anthropomorphic members based upon the body information;

a controller for operating in response to the processor in at least one of a diagnostic mode and a cyclical mode, such that in the diagnostic mode of operation the actuators are controlled by the controller to move the anthropomorphic members relative to one another along the paths of movement derived from the body information to provide to the processor condition information pertaining to a relative ability of the neuromuscular system associated with the selected musculature to perform within the prescribed range of motion, in response to a resistance force applied by the user to the anthropomorphic members throughout the prescribed range of motion, and in the cyclical mode of operation the actuators are controlled by the controller to move the anthropomorphic members relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived by the processor from the condition information and applied by the actuators to the anthropomorphic members is transmitted by the anthropomorphic members to the selected musculature at the coupling sites, with the applied force being varied in response to variations in the further force exerted by the user so as to develop ability in the neuromuscular system associated with the selected musculature;

a memory for storing performance information pertaining to abilities of the neuromuscular system required for performing a particular skill; and a comparator for comparing the information pertaining to the ability in the neuromuscular system associated with the selected musculature with the information pertaining to the abilities required for performing the particular skill so as to derive an updated relative ability and determine paths of movement through a range of motion at a speed of motion and an applied force during repetitive cycles of a subsequent cyclical mode of operation for impressing upon the neuromuscular system of the user the abilities required for performing the particular skill.

9. The apparatus of claim 8 wherein during operation in the cyclical mode, the controller, in response to the processor, varies the applied force such that the applied force is reduced in response to a reduction in the further force, and the applied force is increased in response to an increase in the further force.

10. The apparatus of claim 8 wherein during operation in the cyclical mode, the controller, in response to the processor, varies the applied force such that the applied force is reduced in response to an increase in the further force, and the applied force is increased in response to a reduction in the further force.

11. Interactive apparatus for developing ability in the neuromuscular system of a user of the apparatus, the apparatus comprising:

anthropomorphic members movable through given movements relative to one another;

actuators for moving the anthropomorphic members through the given movements relative to one another in response to actuation of corresponding actuators;

a coupling arrangement for coupling a user with the anthropomorphic members at coupling sites located adjacent selected musculature, and for providing body information pertaining to a unique body habitus of the user at the coupling sites;

a processor for deriving paths of movement through a prescribed range of motion of the anthropomorphic members based upon the body information;

a controller for operating in response to the processor in at least one of a diagnostic mode and a cyclical mode, such that in the diagnostic mode of operation the actuators are controlled by the controller to move the anthropomorphic members relative to one another along the paths of movement derived from the body information to provide to the processor condition information pertaining to a relative ability of the neuromuscular system associated with the selected musculature to perform within the prescribed range of motion, in response to a resistance force applied by the user to the anthropomorphic members throughout the prescribed range of motion, and in the cyclical mode of operation the actuators are controlled by the controller to move the anthropomorphic members relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived by the processor from the condition information and applied by the actuators to the anthropomorphic members is transmitted by the anthropomorphic members to the selected musculature at the coupling sites, with the applied force being varied in response to variations in the further force exerted by the user so as to develop ability in the neuromuscular system associated with the selected musculature;

a memory for storing performance information pertaining to abilities of the neuromuscular system of a particular individual with respect to paths of movement through a range of motion at a speed of motion and an applied force utilized by the particular individual in accomplishing a particular skill; and a comparator for comparing the information pertaining to the ability in the neuromuscular system associated with the selected musculature with the information pertaining to the abilities of the neuromuscular systems of the particular individual required for accomplishing the particular skill so as to derive an updated relative ability and determine paths of movement through a range of motion at a speed of motion and an applied force during repetitive cycles of a subsequent cyclical mode of operation for impressing upon the neuromuscular system of the user the abilities required for performing the particular skill.

12. The apparatus of claim 11 wherein the comparator determines the paths of movement through the range of motion at the speed of motion and the applied force during repetitive cycles of the subsequent cyclical mode of operation by comparing information pertaining to the body habitus of the particular individual with information pertaining to the body habitus of the user.

13. The apparatus of claim 11 wherein during operation in the cyclical mode, the controller, in response to the processor, varies the applied force such that the applied force is reduced in response to a reduction in the further force, and the applied force is increased in response to an increase in the further force.

14. The apparatus of claim 11 wherein during operation in the cyclical mode, the controller, in response to the processor, varies the applied force such that the applied force is reduced in response to an increase in the further force, and the applied force is increased in response to a reduction in the further force.

15. A method for developing ability in the neuromuscular system of a user of the method, the method comprising:
providing anthropomorphic members movable through given movements relative to one another;
coupling a user with the anthropomorphic members at coupling sites located adjacent selected musculature, and obtaining body information pertaining to a unique body habitus of the user at the coupling sites; and
operating the anthropomorphic members in at least one of a diagnostic mode wherein the anthropomorphic members are moved relative to one another along paths of movement through a prescribed range an motion derived from the body information to obtain condition information pertaining to a relative ability of the neuromuscular system associated with the selected musculature to perform within the prescribed range of motion, in response to a resistance force applied by the user to the anthropomorphic members throughout the range of motion, and a cyclical mode wherein the anthropomorphic members are moved relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived from the condition information and applied by the actuators to the anthropomorphic members is transmitted by the anthropomorphic members to the selected musculature at the coupling sites, while the applied force is varied in response to variations in the further force exerted by the user such that the applied force is reduced in response to an increase in the further force, and the applied force is increased in response to a reduction in the further force so as to develop an ability in the neuromuscular system associated with the selected musculature.

16. A method for developing ability in the neuromuscular system of a user of the method, the method comprising:
providing anthropomorphic members movable through given movements relative to one another;
coupling a user with the anthropomorphic members at coupling sites located adjacent selected musculature, and obtaining body information pertaining to a unique body habitus of the user at the coupling sites;
operating the anthropomorphic members in at least one of a diagnostic mode wherein the anthropomorphic members are moved relative to one another along paths of movement through a prescribed range of motion derived from the body information to obtain condition information pertaining to a relative ability of the neuromuscular system associated with the selected musculature to perform within the prescribed range of motion, in response to a resistance force applied by the user to the anthropomorphic members throughout the range of motion, and a cyclical mode wherein the anthropomorphic members are moved relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived from the condition information and applied by the actuators to the anthropomorphic members is transmitted by the anthropomorphic members to the selected musculature at the coupling sites, while the applied force is varied in response to variations in the further force exerted by the user so as to develop an ability in the neuromuscular system associated with the selected musculature;
storing performance information pertaining to the range of motion, the speed of motion, and the applied force transmitted during each of the repetitive cycles; and
comparing subsequent performance information with stored performance information such that operation in the diagnostic mode is repeated in response to subsequent performance reaching a predetermined performance threshold so as to derive an updated relative ability for repetitive cycles of a subsequent cyclical mode of operation.

17. The method of claim 16 wherein during operation of the method in the cyclical mode, the applied force is reduced in response to a reduction in the further force, and the applied force is increased in response to an increase in the further force.

18. The method of claim 16 wherein during operation of the method in the cyclical mode, the applied force is reduced in response to an increase in the further force, and the applied force is increased in response to a reduction in the further force.

19. A method for developing ability in the neuromuscular system of a user of the method, the method comprising:
providing anthropomorphic members movable through given movements relative to one another;
coupling a user with the anthropomorphic members at coupling cites located adjacent selected musculature, and obtaining body information pertaining to a unique body habitus of the user at the coupling sites;
operating the anthropomorphic members in a diagnostic mode wherein the anthropomorphic members are moved relative to one another along paths of movement through a prescribed range of motion derived from the body information to obtain condition information pertaining to a relative ability of the neuromuscular system associated with the selected musculature to perform within the prescribed range of motion, in response to a resistance force applied by the user to the anthropomorphic members throughout the range of motion, and a cyclical mode wherein the anthropomorphic members are moved relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived from the condition information and applied by the actuators to the anthropomorphic members is transmitted by the anthropomorphic members to the selected musculature at the coupling sites, while the applied force is varied in response to variations in the further force exerted by the user so as to develop an ability in the neuromuscular system associated with the selected musculature;

storing performance information pertaining to the abilities of neuromuscular systems of a community of users with respect to musculature corresponding to the selected musculature; and comparing the information pertaining to the ability in the neuromuscular system associated with the selected musculature with the stored performance information pertaining to the corresponding abilities of the community of users so as to derive an updated ability relative to the stored performance information for repetitive cycles of a subsequent cyclical mode of operation.

20. The method of claim 19 wherein during operation of the method in the cyclical mode, the applied force is reduced in response to a reduction in the further force, and the applied force is increased in response to an increase in the further force.

21. The method of claim 19 wherein during operation of the method in the cyclical mode, the applied force is reduced in response to an increase in the further force, and the applied force is increased in response to a reduction in the further force.

22. A method for developing ability in the neuromuscular system of a user of the method, the method comprising:

providing anthropomorphic members movable through given movements relative to one another;

coupling a user with the anthropomorphic members at coupling sites located adjacent selected musculature, and obtaining body information pertaining to a unique body habitus of the user at the coupling sites;

operating the anthropomorphic members in at least one of a diagnostic mode wherein the anthropomorphic members are moved relative to one another along paths of movement through a prescribed range of motion derived from the body information to obtain condition information pertaining to a relative ability of the neuromuscular system associated with the selected musculature to perform within the prescribed range of motion, in response to a resistance force applied by the user to the anthropomorphic members throughout the range of motion, and a cyclical mode wherein the anthropomorphic members are moved relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived from the condition information and applied by the actuators to the anthropomorphic members is transmitted by the anthropomorphic members to the selected musculature at the coupling sites, while the applied force is varied in response to variations in the further force exerted by the user so as to develop an ability in the neuromuscular system associated with the selected musculature;

storing performance information pertaining to abilities of the neuromuscular system required for performing a particular skill; and comparing the information pertaining to the increased ability in the neuromuscular system associated with the selected musculature with the information pertaining to the abilities required for performing the particular skill so as to derive an updated relative ability and determine paths of movement through a range of motion at a speed of motion and an applied force during repetitive cycles of a subsequent cyclical mode of operation for impressing upon the neuromuscular system of the user the abilities required for performing the particular skill.

23. The method of claim 22 wherein during operation in the cyclical mode, the applied force is reduced in response to a reduction in the further force, and the applied force is increased in response to an increase in the further force.

24. The method of claim 22 wherein during operation in the cyclical mode, the applied force is reduced in response to an increase in the further force, and the applied force is increased in response to a reduction in the further force.

25. A method for developing ability in the neuromuscular system of a user of the method, the method comprising:

providing anthropomorphic members movable through given movements creative to one another;

coupling a user with the anthropomorphic members at coupling sites located adjacent selected musculature, and obtaining body information pertaining to a unique body habitus of the user at the coupling sites;

operating the anthropomorphic members in a diagnostic mode wherein the anthropomorphic members are moved relative to one another along paths of movement through a prescribed range of motion derived from the body information to obtain condition information pertaining to a relative ability of the neuromuscular system associated with the selected musculature to perform within the prescribed range at motion, in response to a resistance force applied by the user to the anthropomorphic members throughout the range of motion, and a cyclical mode wherein the anthropomorphic members are moved relative to one another through repetitive cycles along the paths of movement through the range of motion at a predetermined speed of motion such that upon exertion of a further force by the user on the anthropomorphic members during each cycle, with the paths of movement, the range of motion and the speed of motion unalterable by the user, an applied force derived from the condition information and applied by the actuators to the anthropomorphic members is transmitted by the anthropomorphic members to the selected musculature at the coupling sites, while the applied force is varied in response to variations in the further force exerted by the user so as to develop an ability in the neuromuscular system associated with the selected musculature;

storing performance information pertaining to abilities of the neuromuscular system of a particular individual with respect to paths of movement through a range of motion at a speed of motion and an applied force utilized by the particular individual in accomplishing a particular skill; and comparing the information pertaining to the ability in the neuromuscular system associated with the selected musculature with the information pertaining to the abilities of the neuromuscular system of the particular individual required for accomplishing the particular skill so as to derive an updated relative ability and determine paths of movement through a range of motion at a speed of motion and an applied force during repetitive cycles of a subsequent cyclical mode of operation for impressing upon the neuromuscular system of the user the abilities required for performing the particular skill.

26. The method of claim 25 wherein the paths of movement through the range of motion at the speed of motion and the applied force during repetitive cycles of the subsequent cyclical mode of operation are determined by comparing information pertaining to the body habitus of the particular individual with information pertaining to the body habitus of the user.

27. The apparatus of claim 25 wherein during operation in the cyclical mode, the applied force is reduced in response to a reduction in the further force, and the applied force is increased in response to an increase in the further force.

28. The apparatus of claim 25 wherein during operation in the cyclical mode, the applied force is reduced in response to an increase in the further force, and the applied force is increased in response to a reduction in the further force.

* * * * *